United States Patent
Barber et al.

(10) Patent No.: US 9,048,464 B2
(45) Date of Patent: *Jun. 2, 2015

(54) VACUUM CHAMBER METHOD TO FORM POLYMER COATINGS ON POROUS SUPPORT

(75) Inventors: John Barber, Fergus (CA); Hai Yang, Shanghai (CN); Su Lu, Shanghai (CN); Russell James MacDonald, Wilmington, MA (US); Zhigang Deng, Shanghai (CN); Xin Gao, Shanghai (CN)

(73) Assignee: General Electric Company, Schenectady, NY (US)

(*) Notice: Subject to any disclaimer, the term of this patent is extended or adjusted under 35 U.S.C. 154(b) by 36 days.

This patent is subject to a terminal disclaimer.

(21) Appl. No.: 13/996,721

(22) PCT Filed: Dec. 31, 2010

(86) PCT No.: PCT/CN2010/002227
§ 371 (c)(1),
(2), (4) Date: Jun. 21, 2013

(87) PCT Pub. No.: WO2012/088643
PCT Pub. Date: Jul. 5, 2012

(65) Prior Publication Data
US 2013/0280415 A1  Oct. 24, 2013

(51) Int. Cl.
*B05D 5/12* (2006.01)
*H01M 4/04* (2006.01)
(Continued)

(52) U.S. Cl.
CPC .............. *H01M 4/0402* (2013.01); *B05D 5/12* (2013.01); *B05D 1/32* (2013.01); *C23C 18/06* (2013.01);
(Continued)

(58) Field of Classification Search
USPC .................................................. 427/115, 282
See application file for complete search history.

(56) References Cited

U.S. PATENT DOCUMENTS 3,533,852 A * 10/1970 Ng et al. ........................ 429/516
5,470,932 A    11/1995 Jinkerson
(Continued)

FOREIGN PATENT DOCUMENTS

CN    1595691        3/2005
JP    07328394 A    12/1995
(Continued)

OTHER PUBLICATIONS

PCT Search Report and Written Opinion from corresponding PCT Application No. PCT/CN2010/002227, Dated Oct. 20, 2011.
(Continued)

*Primary Examiner* — Brian K Talbot
(74) *Attorney, Agent, or Firm* — Wegman, Hessler & Vanderburg

(57) ABSTRACT

A bi-polar electrode having ion exchange polymers on opposite faces of a porous substrate is formed using a method that includes providing an electrode substrate with activated carbon layers on opposite faces of the electrode substrate, wherein said faces have an outer perimeter band void of the activated carbon layers. Gaskets are placed against the outer perimeter band of the electrode substrate void of activated carbon and the electrode substrate is clamped between two rigid plates to form a first airtight chamber on one side of the electrode substrate and a second airtight chamber on the opposite side of the electrode substrate. A first polymerizable monomer mixture having an anion exchange group is added into the first chamber and a second polymerizable monomer mixture having a cation exchange group is added into the second chamber. The first and second polymerizable monomer mixtures are then polymerized in an oven.

20 Claims, 1 Drawing Sheet

(51) Int. Cl.
*H01M 4/86* (2006.01)
*H01M 4/96* (2006.01)
*B05D 1/32* (2006.01)
*C23C 18/06* (2006.01)

(52) U.S. Cl.
CPC .............. *H01M 4/8657* (2013.01); *H01M 4/96* (2013.01); *H01M 2004/8694* (2013.01); *Y02E 60/50* (2013.01)

(56) References Cited

U.S. PATENT DOCUMENTS

| | | | |
|---|---|---|---|
| 6,296,746 | B1 | 10/2001 | Broman |
| 7,300,719 | B2 | 11/2007 | Elhamid |
| 7,813,106 | B2 | 10/2010 | Cai et al. |
| 8,658,241 | B2 * | 2/2014 | MacDonald et al. ............ 427/77 |
| 2002/0034670 | A1 * | 3/2002 | Suenaga et al. ................. 429/30 |
| 2002/0127474 | A1 | 9/2002 | Fleischer |
| 2007/0087260 | A1 * | 4/2007 | Ji et al. ............................ 429/42 |
| 2009/0026085 | A1 | 1/2009 | Uchi et al. |
| 2011/0024287 | A1 * | 2/2011 | Zheng et al. .................. 204/242 |

FOREIGN PATENT DOCUMENTS

| | | |
|---|---|---|
| JP | 08503997 A | 4/1996 |
| JP | 2003200166 A | 7/2003 |
| JP | 2008147009 | 6/2008 |
| JP | 2008546210 A | 12/2008 |
| JP | 2010513018 A | 4/2010 |

OTHER PUBLICATIONS

Unofficial English translation of Office Action issued in connection with corresponding JP Application No. 2013-546544 on Apr. 30, 2014.

Unofficial English translation of Notice of Allowance issued in connection with corresponding JP Application No. 2013-546544 on Jul. 22, 2014.

\* cited by examiner

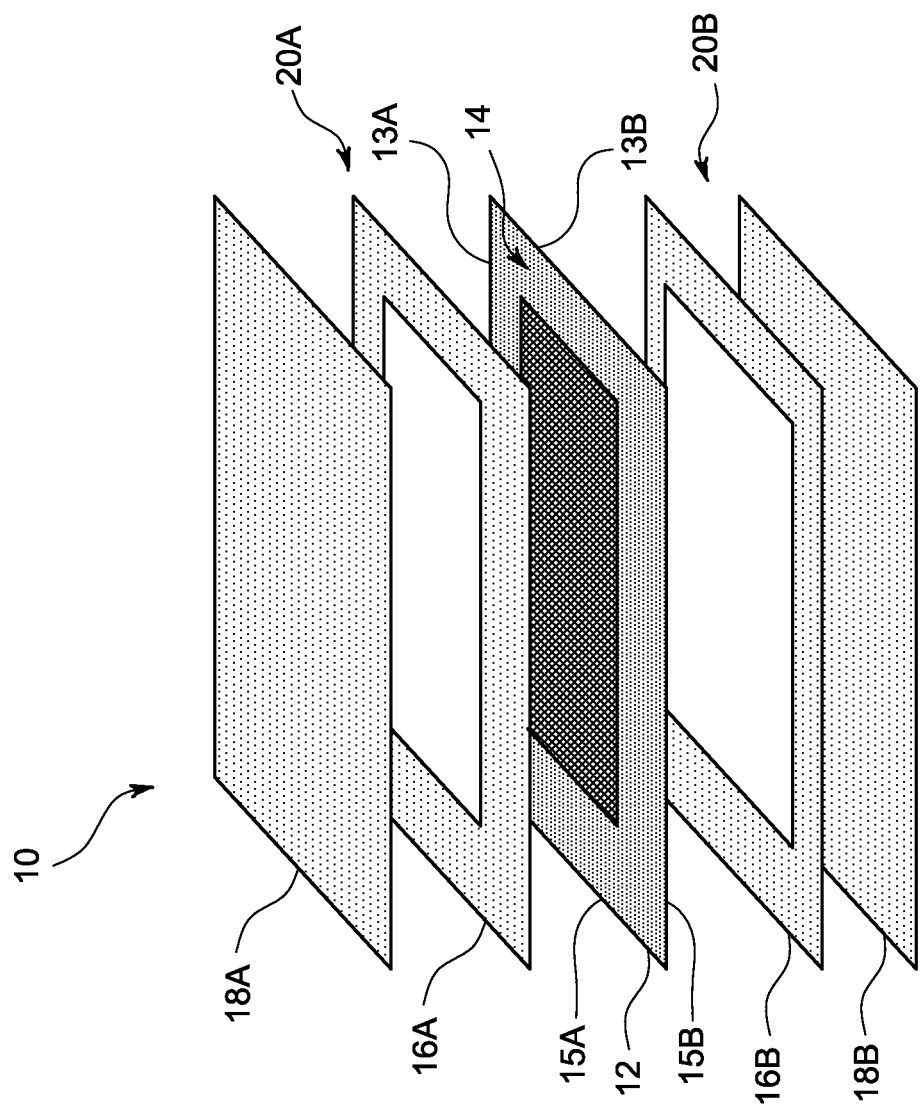

VACUUM CHAMBER METHOD TO FORM POLYMER COATINGS ON POROUS SUPPORT

BACKGROUND OF THE INVENTION

1. Field of the Invention

The invention relates bi-polar electrodes, and more particularly, to a method of simultaneous applying two dissimilar ion exchange polymers to opposite faces of the electrode substrate.

2. Description of Related Art

It is increasingly desirable to purify water using passive deionization. Passive deionization uses bi-polar electrodes, e.g., two sheets having a first side or face formed of material with cation-exchange functionality, and a second side or face with anion-exchange functionality. Each of the two different layers of ion exchange material is porous or otherwise somewhat permeable to a neutral fluid by virtue of its chemistry, physical structure and degree of cross-linking, and each layer possesses ion exchange functionality that operates to transport one type of ion across the material in an electric field, while substantially or effectively blocking most ions of the opposite polarity. With the two materials of different exchange type positioned face-to-face in adjacent layers, ions are effectively "blocked" by one or the other layer and thus cannot traverse the sheet.

Applying the ion exchange monomers to the separate sides of the electrode and polymerizing them creates a bi-polar electrode that is more efficient to operate than a series of monoplaner electrodes with ion exchange membranes pressed against them. In this regard, there is a desire to provide new processes for bi-polar electrode fabrication.

SUMMARY OF THE INVENTION

In one aspect, the invention is directed to a method of forming a bi-polar electrode having ion exchange polymers on opposite faces of a porous substrate. The method includes providing an electrode substrate with activated carbon layers on opposite faces of the electrode substrate, wherein said faces have an outer perimeter band void of the activated carbon layers. Gaskets are placed against the outer perimeter band of the electrode substrate void of activated carbon and the electrode substrate is clamped between two rigid plates to form a first airtight chamber on one side of the electrode substrate and a second airtight chamber on the opposite side of the electrode substrate. A first polymerizable monomer mixture comprised of a polymerizable monomer having an anion exchange group is added into the first chamber and a second polymerizable monomer mixture comprised of a polymerizable monomer having a cation exchange group is added into the second chamber. The first and second polymerizable monomer mixtures are then polymerized in an oven.

The present invention and its advantages over the prior art will become apparent upon reading the following detailed description and the appended claims with reference to the accompanying drawings.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein:

FIG. 1 illustrates a schematic of a bi-polar electrode made according to an embodiment of the invention.

Corresponding reference characters indicate corresponding parts throughout the views of the drawings.

DETAILED DESCRIPTION OF THE INVENTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications, and equivalents as will become apparent from consideration of the following detailed description.

Referring to FIG. 1, a bi-polar electrode 10 comprising a substantially flat electrode substrate 12 with different ion exchange polymer coatings on its opposite sides is shown. The electrode substrate 12 is a porous support with an intermediate conductive film. Desirably, the electrode substrate is made of a thermoplastic polyethylene film to which activated carbon layers are bonded to each face 13A, 13B of the film to form the porous support. The opposite faces 13A, 13B of the electrode substrate are coated with different ion exchange polymers. According to the invention, the opposite faces 13A, 13B of the electrode substrate are coated with two polymerizable monomer mixtures and undergo simultaneous polymerization. Thus, the method described below is particularly suited for simultaneous formation of two dissimilar ion exchange polymer coatings on opposite faces 13A, 13B of the electrode substrate 12.

The electrode substrate 12 is made of a thermoplastic film to which an activated carbon layer is bonded on each face 13A, 13B of the film. However, one skilled in the art will understand that the electrode substrate can also be constructed using other materials without departing from the scope of the invention, including, activated carbon containing fillers such as resins, and binding agents such as TFE and PVDF. In one desirable embodiment, the substrate is generally rectangular-shaped with sides about 10 inches by 21.5 inches in length. However, one skilled in the art will understand that these dimensions are for example purposes only, and other dimensions may be used without departing from the scope of the invention. An outer perimeter of the substrate 12 has a band 14 that is left void of the activated carbon layer.

The first side 15A of electrode substrate 12 has a first face 13A and the second side 15B of electrode substrate 12 has a second face 13B. The first face 13A and second face 13B of the electrode substrate 12 are coated with the ion exchange polymers by placing first and second gaskets 16A, 16B around the outer perimeter of the respective faces 13A, 13B of the electrode substrate 12 against the carbon free band 14. In one embodiment, gaskets 16A, 16B are made of rubber. However, it is contemplated a person having ordinary skill in the art could choose to use another material for gaskets 16A and 16B. A first rigid plate 18A is placed adjacent the first face 13A of the electrode substrate 12 against the first gasket 16A, thereby forming a first chamber 20A around the activated carbon on the first side 15A of the electrode substrate 12. A second rigid plate 18B is placed adjacent the second face 13B of the electrode substrate 12 against the second gasket 16B, thereby forming and a second chamber 20B on the opposite side of the electrode substrate 12. The rigid plates 18A, 18B may be made of glass or other substantially rigid, impervious material. The plates 18A, 18B are clamped together to create a substantially airtight seal around the two faces 13A, 13B of the electrode substrate 12. By forming the chambers 20A, 20B around the porous electrode substrate 12 with the glass plates 18A, 18B, the hindrance of polymerization by oxygen is prevented and surface smoothness is obtained.

A vacuum is drawn in the first and second chambers 20A, 20B to remove air from the activated carbon. In one embodiment, a first needle is inserted into the first chamber 20A through the first gasket 16A and a second needle is inserted into the second chamber 20B through the second gasket 16B. The needles are connected to a conventional vacuum pump with suitable hose connectors. The vacuum pump draws a vacuum in the first and second chambers 20A, 20B to remove air entrapped in the activated carbon.

Next, a first polymerizable monomer mixture is added to the first chamber 20A formed on the first face 13A of the electrode substrate 12 and a second polymerizable monomer mixture is added to the second chamber 20B formed around the second face 13B of the electrode substrate 12. The first and second monomer solutions are non-identical. The liquid monomers displace the air in the activated carbon. Desirably, the first chamber 20A is filled with a first polymerizable monomer mixture comprising a polymerizable monomer having an anion exchange group or a group that can be converted to an anion exchange group. Means for inserting the first polymerizable monomer mixture into the first chamber 20A is inserted through the first gasket 16A. In one embodiment, a first transfer syringe is used to insert the first polymerizable monomer mixture into the first chamber 20A. In one embodiment, the first polymerizable monomer mixture includes a crosslinking agent and a polymerization initiator. The first polymerizable monomer mixture is infiltrated or embedded into the voids of the porous substrate film, and the polymerizable monomer mixture infiltrated is polymerized. Any known polymerizable monomer having an anion exchange group or a group that can be converted to an anion exchange group can be used with no restriction in the first polymerizable monomer mixture. Examples of polymerizable monomer having an anion exchange group are, for example, Trimethylammoniumethylmethacrylate chloride, Methacryloxypropyltrimethylammonium chloride, Vinylbenzyltrimethylammonium chloride, Diallyldimethylammonium chloride, and the like, and salts and derivatives thereof.

Desirably, the second chamber 20B is filled with a second polymerizable monomer mixture comprising a polymerizable monomer having a cation exchange group or a group that can be converted to a cation exchange group. Means for inserting the second polymerizable monomer mixture into the second chamber 20B is inserted through the second gasket 16B. In one embodiment, a second syringe similar to the one used with the first chamber 20A may be used to insert the second polymerizable monomer mixture into the second chamber 20B. In one embodiment, the second polymerizable monomer mixture includes a crosslinking agent and a polymerization initiator. The second polymerizable monomer mixture is infiltrated or imbedded into the voids of the porous substrate film, and the second polymerizable monomer mixture infiltrated is polymerized. The first and second polymerizable monomer mixtures are simultaneously polymerized. Any known polymerizable monomer having a cation exchange group or a group that can be converted to the cation exchange group can be used with no restriction in the second polymerizable monomer mixture. Examples of polymerizable monomer having a cation exchange group are, for example, sulfoethylmethacrylate, acrylamidomethylpropane sulfonic acid, sodiumstyrenesulfonate, sulfopropylmethacrylate, potassium salt, and the like, and salts and derivatives thereof.

As to the crosslinking agent added to the first or second polymerizable monomer mixtures, there is no particular restriction. There can be used, for example, divinyl compounds such as divinylbenzene, divinylsulfone, butadiene, chloroprene, divinylbiphenyl, trivinylbenzene, divinylnaphthalene, diallylamine, divinylpyridine, ethyleneglycol dimethacrylate, other di or multi acrylates or di or multi methacrylates of polyols. Latent crosslinking systems such as hydroymethylacrylamide plus acrylamide or hydroymethylacrylamide plus phenol can also be employed.

As the polymerization initiator, known compounds can be used with no particular restriction. There can be used, for example, organic peroxides such as octanoyl peroxide, lauroyl peroxide, tert-butyl peroxy-2-ethylhexanoate, benzoyl peroxide, tert-butyl peroxyisobutylate, tert-butyl peroxylaurate, tert-hexyl peroxybenzoate, di-tert-butyl peroxide, organic azo compounds such as azobis isobutyronitrile and the like.

In the first and second polymerizable monomer mixtures, the proportions of the polymerizable monomer having the anion or cation exchange groups or groups which can be converted to the anion or cation exchange groups, the crosslinking agent and the polymerization initiator may be in wide ranges as long as each component is present in an amount necessary for the polymerization. The proportion of the crosslinking agent is preferably about 0.4 to 60 mol %, more preferably about 1 to 50 mol %, most preferably about 1 to 40 mol %, of the total amount of the polymerizable monomer having an anion exchange group or a group which can be converted to an anion exchange group and the crosslinking agent.

In the case of a polymerizable monomer that is a crosslinking monomer and also has anion or cation exchange groups or groups which can be converted to the anion or cation exchange groups, it is not necessary for a crosslinking agent to be present in the mix. Accordingly, the proportion of crosslinking agent would be about 100 mol %. However, a crosslinking agent, or a non crosslinking monomer could be used to dilute the amount of ion exchange group density.

The polymerization initiator is used in an amount of generally about 0.1 to 20 mass parts, preferably about 0.5 to 10 parts by mass relative to 100 mass parts of the polymerizable monomer having an exchange group or a group which can be converted to an exchange group.

In one embodiment, after the first and second polymerizable monomer mixtures are inserted into the first and second chambers, the first and second polymerizable monomer mixtures are allowed to stand for a selected duration of time. Suitable durations are generally between about 1 and 20 minutes, more preferably between about 5 and 15 minutes, and in one embodiment, about 10 minutes. After standing, the excessive portions of the polymerizable monomer mixtures may then be removed before the polymerizable mixtures are polymerized.

In producing the bi-polar electrode 10, the first and second polymerizable monomer mixtures are contacted with the porous substrate formed by the activated carbon layer on the electrode substrate 12, as described previously. In polymerizing the first and second polymerizable monomer mixtures, a known polymerization method is employed with no restriction. In one embodiment, the envelope containing the electrode substrate is placed in an oven and the vinyl monomers are polymerized onto the faces of the substrate. Thermal polymerization using a polymerization initiator is preferred generally because the operation is easy and polymerization can be conducted relatively uniformly. The temperature of the thermal polymerization is not particularly restricted and a known temperature condition may be selected appropriately. Suitable temperatures are generally between about 50 and 150° C., more preferably between about 60 and 120° C., and in one embodiment, about 85° C. The duration of the thermal polymerization is also not particularly restricted and known duration conditions may be selected appropriately. Suitable durations are generally between about 10 and 120 minutes, more preferably between about 45 and 90 minutes, and in one embodiment, about 60 minutes. Polymerization of the first and second polymerizable monomer mixtures may also be by any known chemical catalytic procedure or using ultraviolet light without departing from the scope of the invention.

In order that those skilled in the art will be better able to practice the present disclosure, the following example is given by way of illustration and not by way of limitation.

Example

The electrode was made by cutting the electrode substrate with activated carbon layers to a size of 10 inches (25.4 cm) by 21.5 inches (54.6 cm). The outer perimeter of the electrode substrate was maintained free of activated carbon, leaving 1.5 inches (3.8 cm) of trim around the two long side edges and the short bottom edge of the electrode substrate. The top edge was cut to 2 inches. Rubber gaskets were placed against the electrode substrate in the area void of carbon around the perimeter of the substrate. The electrode substrate was then sandwiched between glass plates and the electrode/glass plate sandwich was clamped together, thereby forming airtight chambers on each side of the electrode substrate around the activated carbon. A vacuum was formed in the first and second chambers by inserting needles connected to a vacuum pump into the first and second chambers through the first and second gaskets with suitable hose connectors.

Monomer-addition syringes were then inserted into the first and second chambers through the first and second gaskets. 140 grams of the first polymerizable monomer mixture comprised of a polymerizing monomer having an anion exchange group was inserted into the first chamber using a first syringe and 140 grams of the second polymerizable monomer mixture comprised of a polymerizing monomer having a cation exchange group was inserted into the second chamber using a second syringe.

The electrode substrate/glass plate assembly was then placed horizontally into a preheated 85° C. oven for 1 hour. The electrode substrate/glass plate assembly was removed from the oven and was allowed to cool for ½ hour. The clips were then removed and the electrode substrate was separated from the glass plates.

The artisan can also appreciate the fact that pressure can be applied to the chambers pressing the polymerizing AIX and CIX materials into a flat or planar disposition within their respective chambers.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the scope of the disclosure as defined by the following claims.

What is claimed is:

1. A method of forming a bi-polar electrode having ion exchange polymers on opposite faces of a porous substrate, the method comprising:
   providing an electrode substrate with activated carbon layers, said electrode substrate having a first side and a second side, said first side having a first face and said second side having a second face, said first side and second side are opposite;
   wherein said first face and said second face each have an outer perimeter band void of the activated carbon layers;
   providing a first gasket to the outer perimeter band of the first face, and a second gasket to the outer perimeter band of the second face;
   clamping the electrode substrate between two rigid plates to form a first air-tight chamber on the first side of the electrode substrate and a second air-tight chamber on the second side of the electrode substrate;
   adding a first polymerizable monomer mixture into the first air-tight chamber, the first polymerizable monomer mixture comprising a polymerizable monomer having an anion exchange group or a group that can be converted to an anion exchange group;
   adding a second polymerizable monomer mixture into the second air-tight chamber, the second polymerizable monomer mixture comprising a polymerizable monomer having a cation exchange group or a group that can be converted to the cation exchange group; and
   polymerizing the first and second polymerizable monomer mixtures.

2. The method of claim 1, wherein the first and second polymerizable monomer mixtures are polymerized by thermal polymerization.

3. The method of claim 2, wherein the first and second polymerizable monomer mixtures are polymerized by placing the electrode substrate into an oven at about 50° C. to about 150° C.

4. The method of claim 3, wherein the first and second polymerizable monomer mixtures are placed in the oven for about 10-120 minutes.

5. The method of claim 2, wherein the polymerizable monomer having an anion exchange group or a group that can be converted to an anion exchange group is selected from the group consisting of trimethylammoniumethylmethacrylate chloride, methacryloxypropyltrimethylammonium chloride, vinylbenzyltrimethylammonium chloride, diallyldimethylammonium chloride, and salts and derivatives thereof.

6. The method of claim 2, wherein the polymerizable monomer having a cation exchange group or a group that can be converted to the cation exchange group is selected from the group consisting of sulfoethylmethacrylate, acrylamidomethylpropane sulfonic acid, sodiumstyrenesulfonate, sulfopropylmethacrylate, potassium salt, and salts and derivatives thereof.

7. The method of claim 1, further comprising inserting a first syringe into the first chamber through the first gasket and a second syringe into the second chamber through the second gasket and adding the first and second polymerizable monomer mixture into the first and second chambers through the first and second syringes, respectively.

8. The method of claim 1, wherein the first polymerizable monomer mixture is further comprised of a crosslinking agent.

9. The method of claim 8, wherein said crosslinking agent is a divinyl compound or a latent crosslinking system.

10. The method of claim 9, wherein the divinyl compound is selected from the group consisting of divinylbenzene, divinylsulfone, butadiene, chloroprene, divinylbiphenyl, trivinylbenzene, divinylnaphthalene, diallylamine, divinylpyridine, ethyleneglycol dimethacrylate, di acrylates, multi acrylates, di methacrylates of polyols, or multi methacrylates of polyols.

11. The method of claim 9, wherein the latent crosslinking system is selected from the group consisting of hydroymethylacrylamide plus acrylamide or hydroymethylacrylamide plus phenol.

12. The method of claim 8, wherein the first polymerizable monomer mixture is further comprised of a polymerization initiator.

13. The method of claim 12, wherein said polymerization initiator is an organic peroxide or an organic azo compound.

14. The method of claim 13, wherein said polymerization initiator is selected from the group consisting of octanoyl peroxide, lauroyl peroxide, tert-butyl peroxy-2-ethylhexanoate, benzoyl peroxide, tert-butyl peroxyisobutylate, tert-butyl peroxylaurate, tert-hexyl peroxybenzoate, di-tert-butyl peroxide, or azobis isobutyronitrile.

15. The method of claim 1, wherein the second polymerizable monomer mixture is further comprised of a crosslinking agent.

16. The method of claim 15, wherein said crosslinking agent is a divinyl compound or a latent crosslinking system.

17. The method of claim 16, wherein the divinyl compound is selected from the group consisting of divinylbenzene, divinylsulfone, butadiene, chloroprene, divinylbiphenyl, trivinylbenzene, divinylnaphthalene, diallylamine, divinylpyridine, ethyleneglycol dimethacrylate, di acrylates, multi acrylates, di methacrylates of polyols, or multi methacrylates of polyols.

18. The method of claim 16, wherein the latent crosslinking system is selected from the group consisting of hydroymethylacrylamide plus acrylamide or hydroymethylacrylamide plus phenol.

19. The method of claim 15, wherein the second polymerizable monomer mixture is further comprised of a polymerization initiator.

20. The method of claim 19, wherein said polymerization initiator is an organic peroxide or an organic azo compound.

* * * * *